June 14, 1932. H. A. DOUGLAS 1,862,739
SIGNALING SYSTEM FOR AUTOMOTIVE VEHICLES
Original Filed May 16, 1929 3 Sheets-Sheet 1
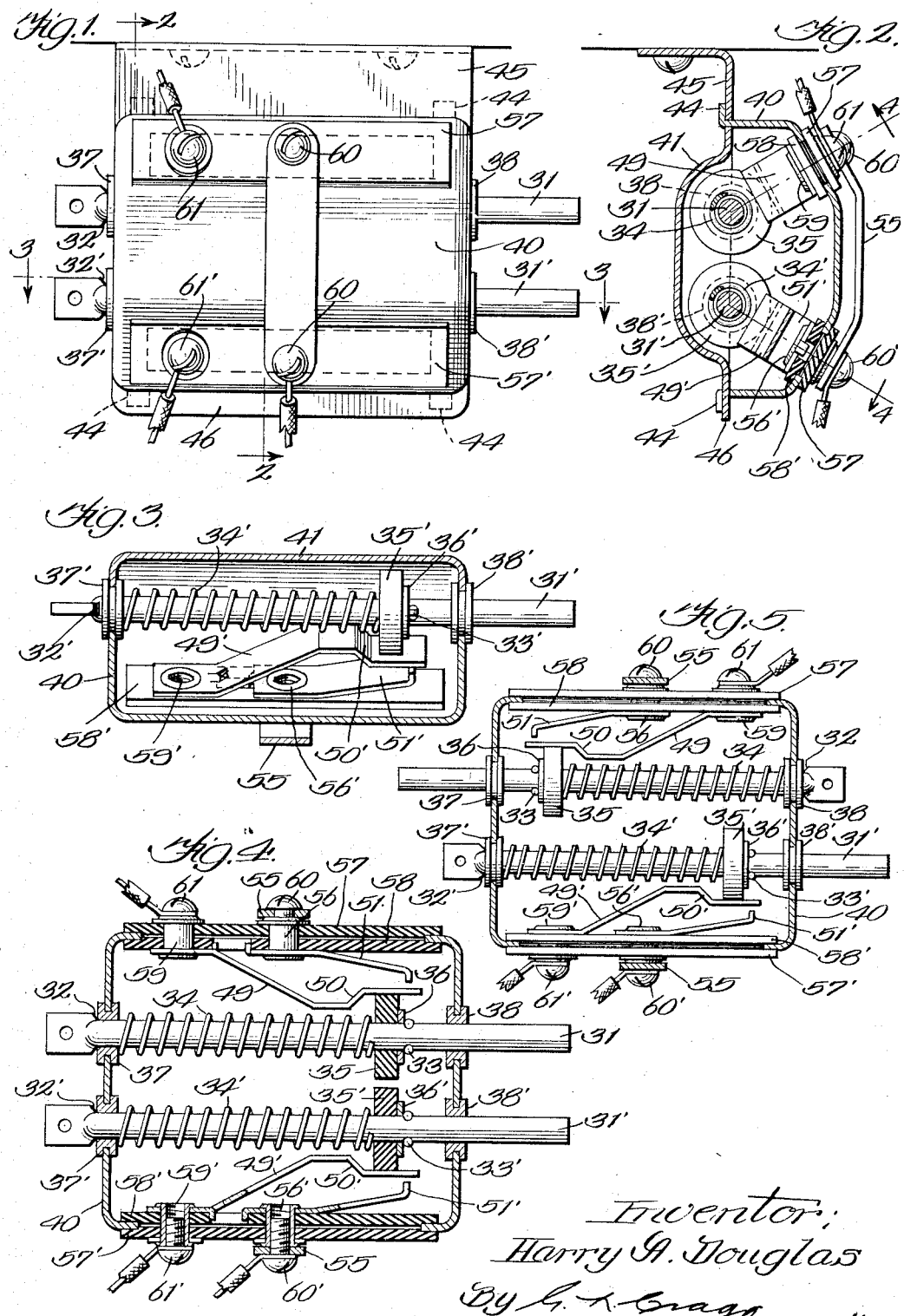

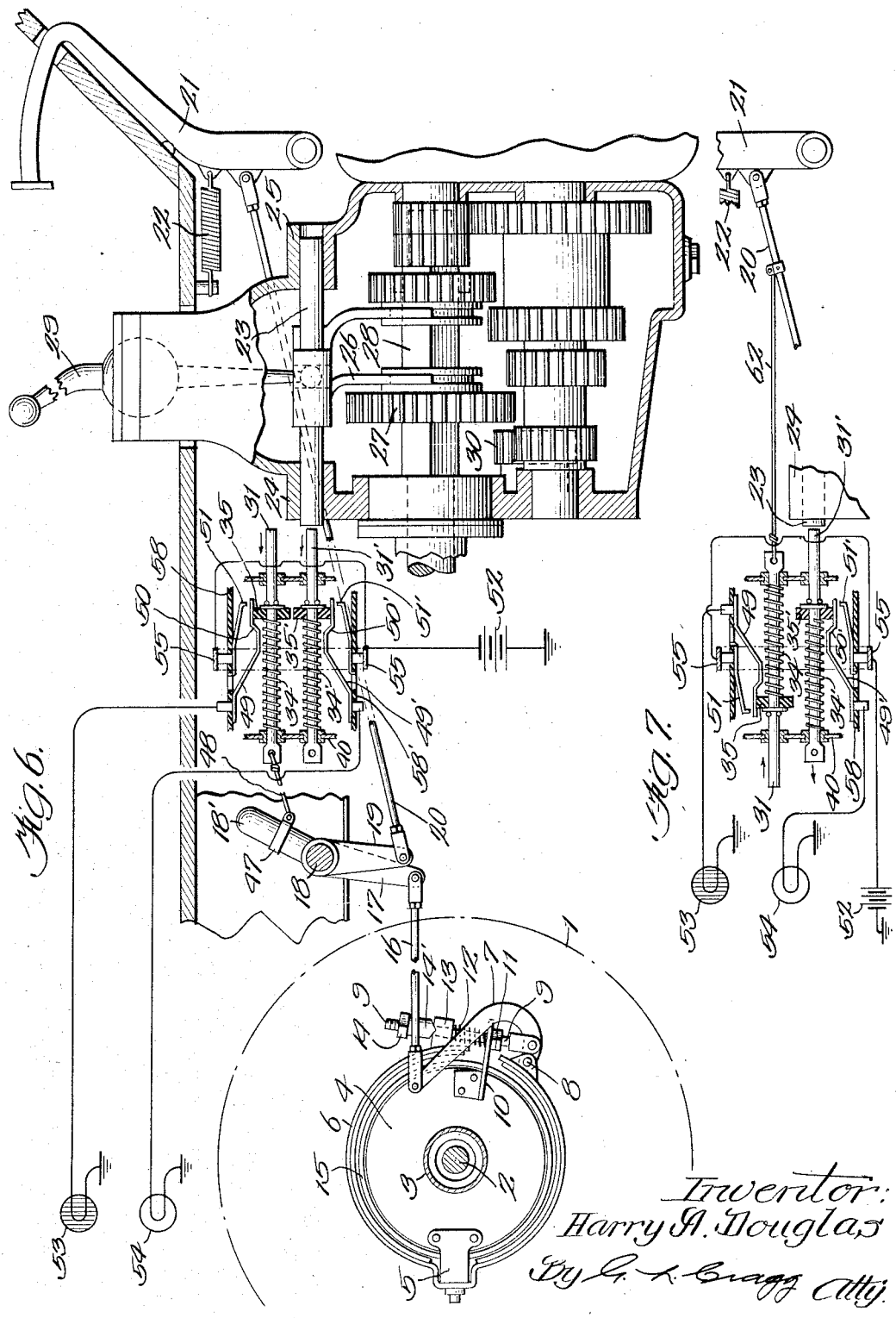

June 14, 1932.   H. A. DOUGLAS   1,862,739
SIGNALING SYSTEM FOR AUTOMOTIVE VEHICLES
Original Filed May 16, 1929   3 Sheets-Sheet 3

Inventor:
Harry A. Douglas
By G. L. Cragg
Atty.

Patented June 14, 1932

1,862,739

UNITED STATES PATENT OFFICE

HARRY A. DOUGLAS, OF BRONSON, MICHIGAN

SIGNALING SYSTEM FOR AUTOMOTIVE VEHICLES

Original application filed May 16, 1929, Serial No. 363,682. Divided and this application filed May 19, 1930. Serial No. 453,505.

My invention relates to signaling systems for automotive vehicles and to switching mechanism that may be employed therein. In carrying out my present invention two switching devices are provided within a single casing, one of these switching devices being individual to the brake applying mechanism and the other to the mechanism that effects reverse or backward movement of the vehicle. These switching devices have circuit connections common thereto and effected at the casing. In the preferred embodiment of the invention each switching device is inclusive of an actuating rod, each rod being spring pressed in one direction and operated by the braking or reversing mechanism to which it pertains in the reverse direction. In accordance with my invention both actuating rods may be urged in the same direction by springs individually thereto and in the opposite direction by braking and reversing mechanism respectively, or the springs may urge the rods in opposite directions, respectively reverse to the directions in which they are urged by the braking and reversing mechanisms. The switching mechanism of my invention is so constructed that its parts may be readily rearranged to enable the two devices in the switching mechanism to be operated in the selected way.

Figure 8:
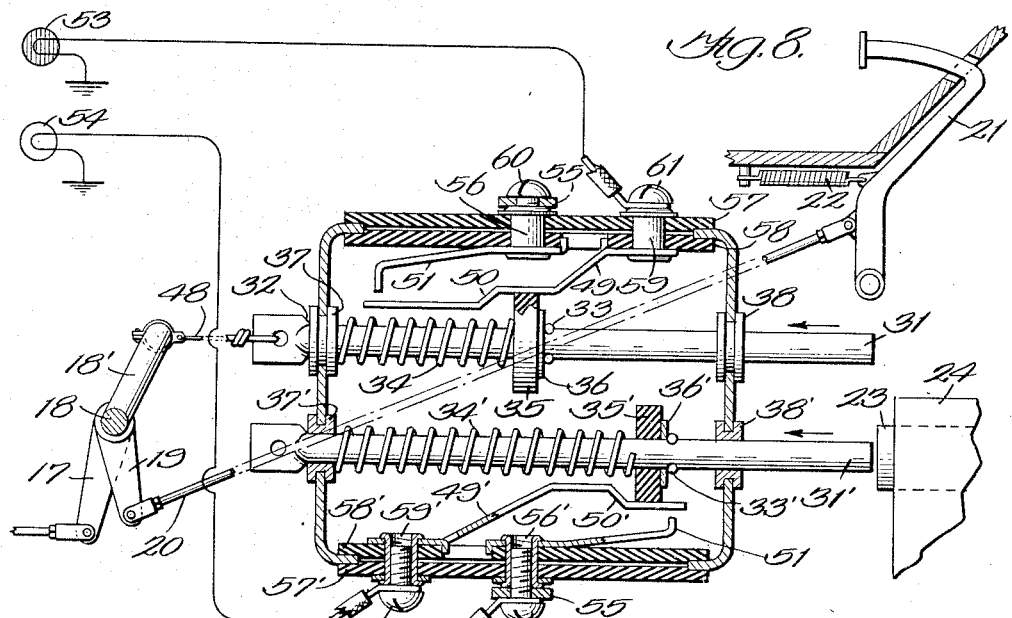
Figure 9:
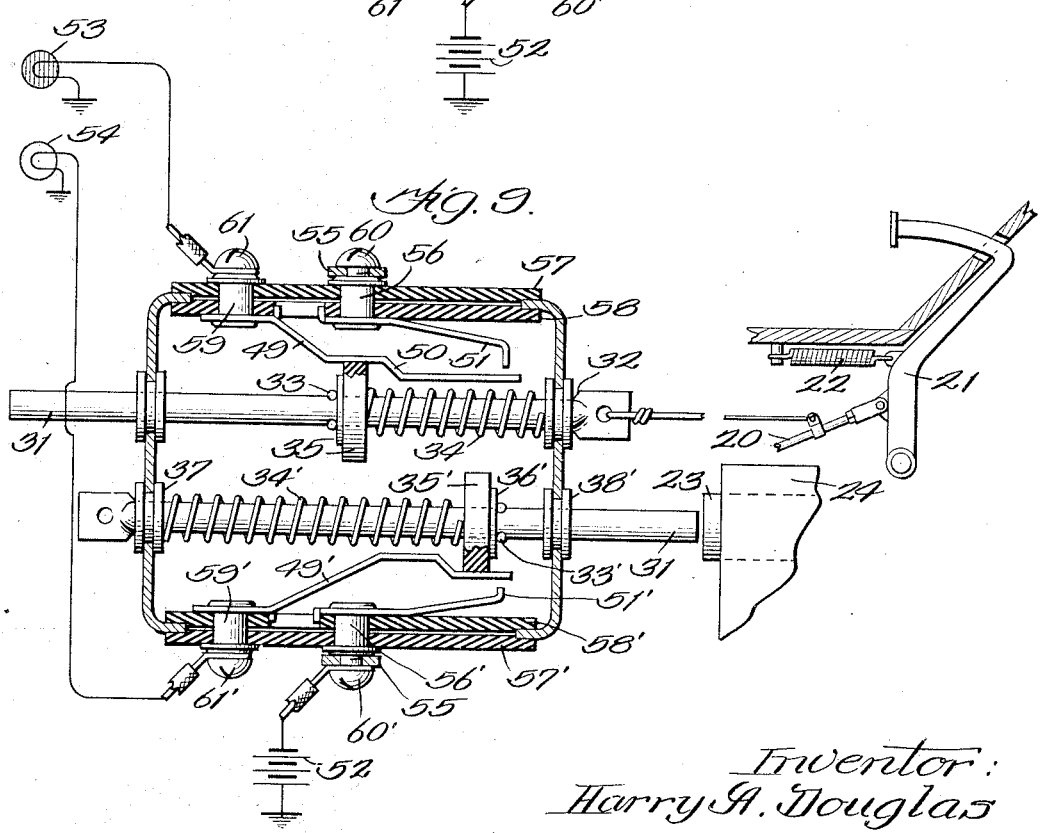

The invention will be more fully explained in connection with the accompanying drawings in which Fig. 1 is a side elevation illustrating the preferred form of a switching mechanism; Fig. 2 is a sectional view on line 2—2 of Fig. 1; Fig. 3 is a sectional view on line 3—3 of Fig. 1; Fig. 4 is a sectional view on line 4—4 of Fig. 2; Fig. 5 is a view similar to Fig. 4, but on a smaller scale, and illustrating a rearrangement of some of the parts; Fig. 6 is a view somewhat diagrammatic illustrating the reversing and braking mechanism of an automotive vehicle with the switching mechanism illustrated in Figs. 1, 2, 3 and 4, the signal circuits governed by the switching mechanism being also diagrammatically indicated; Fig. 7 illustrates the substitution of the switch of Fig. 5 or the other switch; Fig. 8 illustrates the modification of the switch employed in the arrangement of Fig. 6; and Fig. 9 is a view similar to Fig. 8, but with some of the parts of the switching mechanism in rearrangement.

The automotive vehicle mechanism illustrated is provided with vehicle wheels. One of these wheels, indicated at 1, is one of the rear driving wheels which is carried upon one section 2 of the driving shaft, these shaft sections being coupled by differential gearing as is well understood. This driving shaft, having the differentially coupled sections 2, is enclosed by a stationary housing indicated at 3. A stationary disc 4 is mounted upon each end of the housing, each driving wheel having such a disc at its inner side. Each disc carries a stationary bracket 5 and each bracket carries a brake band 6, in the form of a split ring, the bracket being secured to the ring near the mid-portion thereof. A lever 7 is pivoted, at one end, to and near one end of each ring, such a point of pivotal connection being indicated at 8. A rod 9 has one end in pivotal connection with each lever 7 and near the pivot 8 of such lever. This rod passes through a bracket 10 upon the corresponding disc 4. Nuts 11 upon each rod engage the underside of the corresponding bracket 10. A coiled spring 12 surrounds each rod 9 and is interposed between the top side of the corresponding bracket 10 and a lug 13 that is provided upon the corresponding brake band 6 and at the other end of this brake band opposite the pivot 8. A nut 14 is screwed upon the upper end of each rod 9, this nut having a continuation 14′ which bears upon the top side of the corresponding lug 13. When the upper end of the lever 7 is pulled to the right, the brake band 6 is contracted to engage the brake drum 15 surrounding the corresponding disc 4. Each brake lever 7 has its upper end connected by a link 16 with an arm 17 which is fixed upon a brake rod 18 that extends between both braking mechanisms pertaining the vehicle wheels 1. Another arm 19 is also fixed upon the brake rod 18. This latter arm is connected by a link 20 with an intermediate portion of the pedal lever 21. Each time said pedal lever is depressed it moves in a clockwise direction and pulls the link 20 to the right to cause a partial rotation of the rod 18 in a counterclockwise direction. Said rod, in thus turning, moves both arms 17 in a counterclockwise direction. These arms turn the brake levers 7 in a clockwise direction to contract the brake bands 6 and frictionally engage these bands with the corresponding brake drums 15. When the pedal lever 21 is released the spring 22 serves to restore it by turning it in a counterclockwise direction, whereby the brakes are released. When the brakes are released the springs 12 take part in opening the brake bands. This braking mechanism is well known and has only been described, to some extent because of its interrelation with my switching mechanism.

The gear shifting mechanism illustrated is also well known. It will suffice to mention the portions thereof which are concerned in reversing the direction of travel of the automotive vehicle, at which time the switching mechanism of my invention is also brought into play. A yoke rod 23 is disposed in guideways 24, 25 which are provided in the gear casing. The yoke 26 which is carried by the yoke carrying rod 23 is received within an annular groove provided in the hub of the spur gear 27. This spur gear has a square hole through its central or hub portion which snugly receives the square shaft 28 which turns in a fixed plane and along which the gear 27 may slide. When the shift lever 29 is properly placed in a forward position the spur gear 27 is moved rearwardly into mesh with the spur pinion 30 which is so driven by the engine as to effect a reversal in the normal direction of rotation of the shaft 28, whereby the shaft sections 2 have their normal direction of rotation reversed to cause the vehicle to move backwardly.

I will next describe the switching mechanism of my invention as it is employed in the arrangement illustrated in Fig. 4.

The switching mechanism illustrated includes a reciprocable rod 31 made preferably of iron or steel. Two abutments or sets of abutments 32 and 33 are desirably integrally formed with the rod and are spaced apart longitudinally of the rod. A coiled spring 34 surrounds the rod and is disposed between said abutments. A switch controlling collar 35, formed preferably of insulation, is slipped upon one end of the rod, together with a washer 36, before the abutments on this end of the rod are formed, said washer being interposed between said collar and the abutments 33, said collar being disposed between the abutments 32 and 33 and between one end of the spring 34 and the abutments 33. A bearing sleeve 37 surrounds and is in sliding relation to the rod 31 and is interposed between the abutments 32 and the other end of the spring 34, this bearing sleeve 37 being consequently interposed between the abutments 32 on one end of the rod and the abutments 33 on the other end of the rod. The spring 34 is compressed between the bearing sleeve 37 and the collar 35 whereby the collar 35 and washer 36 are pressed against the abutments 33 and the abutments 32 are pressed against the sleeve 37. A second bearing sleeve 38 also surrounds and is in sliding relation to the rod, the abutments 33 being between the collar 35 and this second bearing sleeve 38.

The switch carrier or casing is made in two sections, one a cap section 40 and the other a mounting section 41, the two casing sections meeting upon a plane that contains the axis of the rod when the rod is assembled with the casing. The end walls of the casing sections 40 and 41 are formed with circular openings through which rod 31 passes and which are complete when the casing sections are assembled.

As illustrated, the casing section 40 is formed with ears 44 that are passed through openings formed in the wings 45 and 46 that project from the longitudinal margins of the casing section 41, these ears being thereafter turned into clinching engagement with said wings. The end walls of the casing firmly hold bearing sleeves 37 and 38 in fixed relation so that the rod 31 may be moved against the force of the spring 34.

The rod is pulled upon when the pedal lever 31 is turned clockwise to apply the brake. To this end the brake rod has a lateral portion 18' which is surrounded by a collar 47 that is connected with the left hand end of the rod 31 by a wire link 48. When the rod 31 is pulled upon coincidently with the application of the brakes, the insulating collar 35 rides upon the unmounted end of a leaf spring contact arm 49 and into engagement with the hump 50 upon this arm whereby the contact arm 49 is engaged with the contact 51 complemental thereto. As a result the circuit is established which may be traced from the grounded battery 52 through the contacts 51 and 49 the stop signaling incandescent lamp 53 to ground.

The switching device that pertains to the reversing mechanism is similar to that which pertains to the braking mechanism, similar parts being given similar characters of reference with prime exponents added. As illustrated in Fig. 6, the rod 31' is pushed upon by the yoke carrying rod 23 of the gear shifting mechanism when the vehicle is adjusted into reverse so that the collar 35' will ride upon the hump 50' to establish the back up signal circuit which may be traced from the grounded back up signaling lamp 54 through the contacts 49' and 51' to the grounded battery 52. This battery is thus common to the circuits of the two switches by means of contacts that are carried by the casing that is common to both switches.

The contacts 51 and 51' are connected in multiple by a current connecting metallic bar or strap 55. Riveting sleeves 56 and 56' pass through the contacts 51 and 51' respectively, these contacts being clamped between the flanges upon the ends of these sleeves. Bars of insulation 57 and 58 are clamped, with the contact 51, between the flanges upon the ends of the sleeve 56. Other bars of insulation 57' and 58' are similarly clamped, with the contact 51' between the flanges upon the ends of the sleeves 56'. Rectangular openings of smaller dimensions than these bars are formed through the casing section 40. The bars are disposed at these openings, the margins of the openings respectively individual to each pair of bars being clamped between these bars. Each of the insulating bars desirably has a facial portion that is snugly received within the rectangular opening in the casing to which it pertains, whereby these bars are properly positioned. A riveting sleeve 59 clamps the contact arm 49 and the insulating bars 57 and 58 between its flanges. The riveting sleeve 59' similarly clamps the contact arm 49' and the insulating bars 57' and 58' between its flanges. Binding screws 60 and 61 are screwed into the riveting sleeves 56 and 59. Binding screws 60' and 61' are screwed into the riveting sleeves 56' and 59'. Binding screw 60 also passes through the strap or bridging member 55 and brings this bridging member into connection with the contact 51. Binding screw 60' also passes through the strap or bridging member 55 and brings this bridging member into direct connection with the contact 51'. The binding screw 60' also serves to clamp one of the circuit wires in place. The binding screws 61 and 61' serve, also, to clamp other circuit wires in place. The bridging member or strap 55 is located mid-way between the ends of the insulating bars 57, 58 and 57', 58'. By this arrangement of the element 55 the said insulating bars may, in the initial assembly of the switch, be placed in the positions shown in Fig. 4 or the pair of bars 57 and 58 may be reversed as shown in Fig. 5 and Fig. 7 to reverse the positions of the contacts 49 and 51. Such reversal of these contacts is effected when the switch actuating rod is reversed in order that it may be more directly associated with the pedal lever 21 as illustrated in Fig. 7. In this figure, I have shown a wire link 62 connecting the now reversed and forward end of the rod 31 with the link 20. The reversability of the insulating bars 57 and 58 also enable the rearrangement and slight modifications illustrated in Figs. 8 and 9.

In each of the illustrated uses of the switching mechanism of my invention, the switch actuating rod 31' is pushed upon by the yoke rod 23 of the gear shifting mechanism to close the circuit of the back up signaling lamp 54 whenever the lever 29 is placed in its forward and reverse position. In the arrangement of Figs. 6 and 8 the switch actuating rod 31 is pulled upon by the pedal lever 21 toward the left to close the circuit of the stop signaling lamp 53. In the arrangement of Fig. 7 and Fig. 9 the rod 31' is pulled upon to the right, by the pedal lever, to close the stop light signaling circuit.

It will be observed that my improved switching mechanism is inclusive of a casing or support therefor, a contact arm having two places of assembly with said support, a contact assembled with the support between the aforesaid two places of assembly, and a member in actuating relation with said switch arm. It will also be observed that the actuating member of the switching device is in the form of a rod having a part thereon engageable with the corresponding contact arm at one side of the place of assembly of the contact complemental to this arm and also reversible to correspond with the reversal in position of the arm. The present case is a division of my application Serial No. 363,682 filed May 16, 1929 (Case 248).

Changes may be made without departing from the invention.

Having thus described my invention, I claim:

As an article of manufacture, a switch for automotive signaling system comprising, in combination, a casing; a plurality of pairs of bearings in each end of the casing, the casing being split along a plane passing through the axes of all of the bearings; a plurality of reciprocable rods in the bearings and projecting from the casing at each end thereof; a contact member carried by the wall of the casing individual to each rod and operable thereby upon movement of the rod in one direction, said rods and said contact members being reversible in the casing; a contact individual to each rod and complemental to each said contact member; a metallic strap connecting the complemental contacts individual to each rod; and a coil spring on each rod urging it away from its contact member.

In witness whereof, I hereunto subscribe my name.

HARRY A. DOUGLAS.